May 29, 1928.

G. BLONDO

ANTISKID DEVICE

Filed March 9, 1927

George Blondo
INVENTOR

BY Victor J. Evans
ATTORNEY

May 29, 1928.
G. BLONDO
ANTISKID DEVICE
Filed March 9, 1927    2 Sheets-Sheet 2
1,671,885
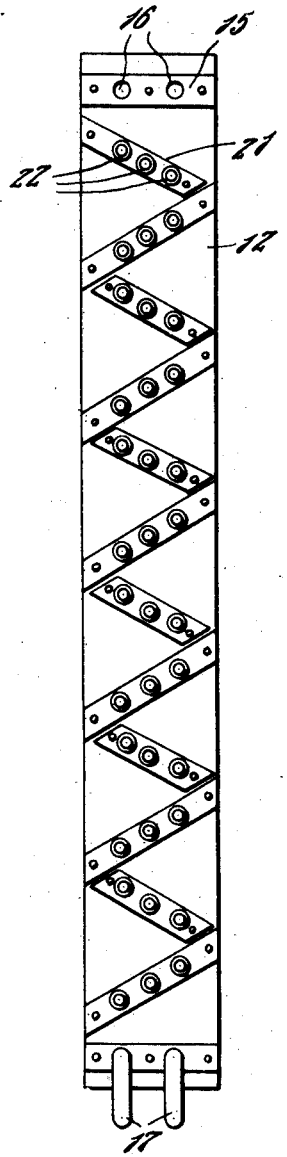
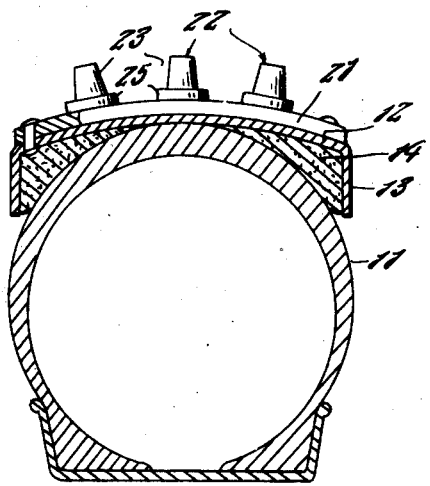
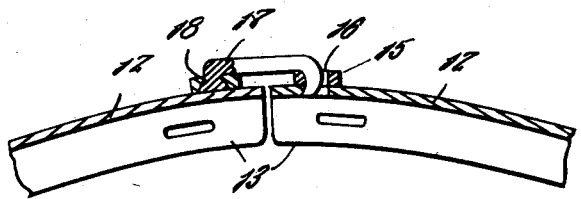
George Blondo
INVENTOR
BY Victor J. Evans
ATTORNEY Patented May 29, 1928.

1,671,885

UNITED STATES PATENT OFFICE.

GEORGE BLONDO, OF ST. PAUL, MINNESOTA.

ANTISKID DEVICE.

Application filed March 9, 1927. Serial No. 174,019.

This invention relates to anti-skid devices, and comprehends a novel construction and arrangement of parts which permits the device to be applied to the wheel of a car without the necessity of jacking the wheel off the ground, and designed to effectively prevent skidding of the machine incident to the application of the brakes.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 2 is a plan view of one of the sections of the device.

Figure 3 is a transverse sectional view through the device and tire to which it is applied.

Figure 4 is a fragmentary sectional view showing how the adjacent sections of the device are connected together.

Figure 1:
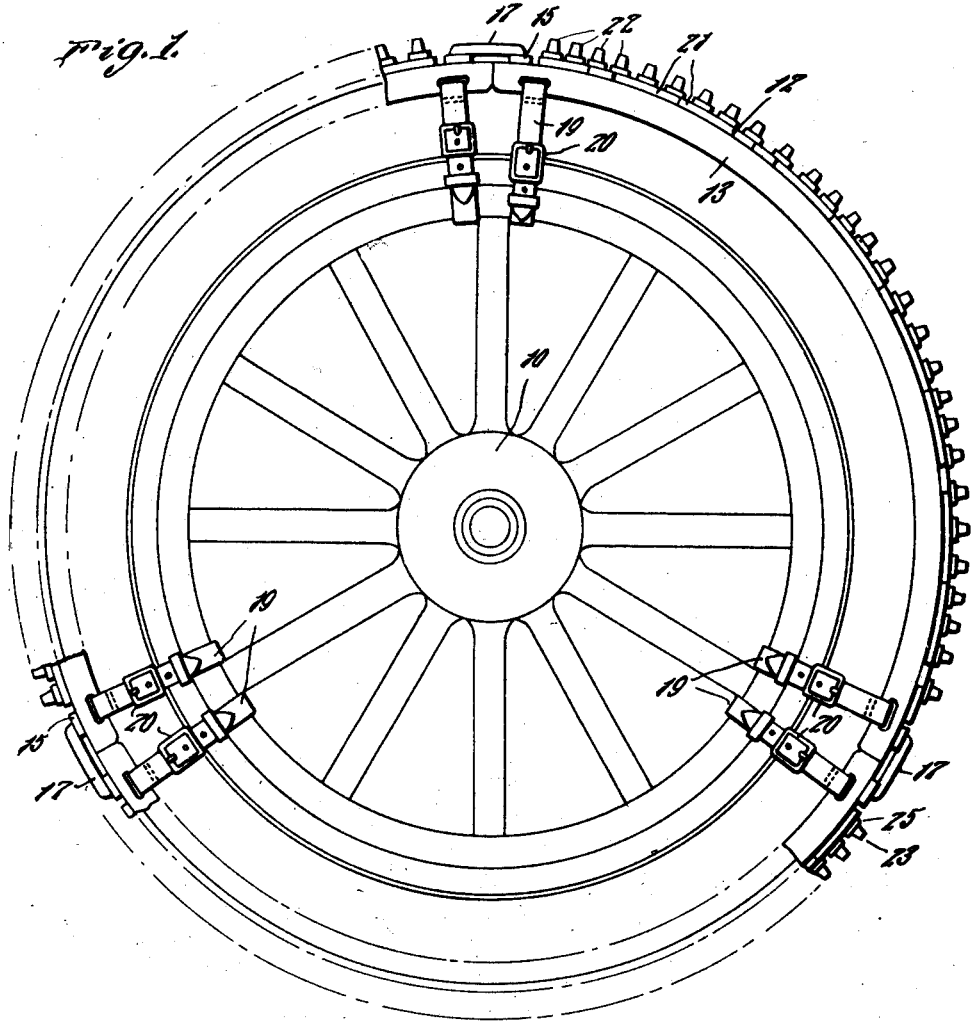
Figure 1 is a side elevation of a wheel showing the application of the invention.

Referring to the drawings in detail 10 indicates a wheel equipped with a pneumatic tire 11 about the periphery of which the anti-skid device is adapted to be arranged.

This device is preferably made up of a plurality of sections 12, and each section is preferably of the cross sectional configuration illustrated in Figure 3. These sections may be constructed from any suitable material, preferably metal and vary in size without departing from the inventive idea. Each section is of a width to extend entirely across the tread of the tire 11 and formed with inturned flanges 13 as illustrated, while each section is also provided with a lining of some relatively soft material indicated at 14 to protect the tire from injury. Arranged transversely across each section adjacent the ends thereof is a metal strip 15 which is riveted or otherwise secured to the section, and each of these strips is provided with openings 16, so that when the sections are arranged in end to end relation about the tire they can be conveniently connected together in any suitable manner without the necessity of jacking the wheel off the ground.

For the purpose of connecting these sections together I preferably make use of staple-like links indicated at 17, there being two of such links connecting the ends of the adjacent sections. As shown in Figure 4 each link has one of its ends swiveled as at 18 and the openings 16 on one section, while the other ends of the staples terminate to form hooks which are received by the openings in the strip 15 carried by the other section, the last mentioned openings communicating with openings formed in the section itself. By reason of this construction each section is applied to the tire singly, and as each section is added to the device the hook-like extremities of the links are slipped in the openings 16 of the section being applied.

After all of the sections have been connected together about the periphery of the tire, the device in its entirety is secured to the wheel in any suitable manner. For this purpose I preferably make use of straps 19 which are connected with the inturned flanges of the sections adjacent the meeting end thereof, and which straps are adapted to be passed about the felly of the wheel to hold the device in place. Each strap of course is provided with a buckle so that the strap can be properly adjusted for the purpose intended.

Figure 5:
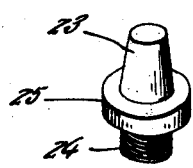
Figure 5 is a perspective view of one of the lugs.

Arranged across the outer surface of each section 12 is a plurality of diagonally arranged metal straps 21 as clearly shown in Figure 2, and each of these straps is provided with a series of threaded openings 22 into which lugs 23 are fitted. While these lugs may vary in size and shape, they are preferably of the construction shown in Figure 5, wherein each lug is provided with a threaded extremity 24 adapted to be screwed into one of the openings 22, and limited in its movement in the direction of the section by a flange 25. The lug proper is preferably tapered as shown. By reason of this construction the lugs are arranged in a zigzag fashion across the entire periphery of the anti-skid device, which renders the latter particularly effective for the purpose intended.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

An anti-skid device for wheels comprising a plurality of segmental sections adapted to be arranged in end to end relation about the periphery of the wheel, transverse metal straps extending across the respective sections adjacent the meeting ends thereof, each of said straps having a plurality of openings, and staple-like links connecting said sections together, each link having an offset headed portion swivelly mounted in the openings of one of said straps, the opposite end of each link terminating in a hook to be received by one of the openings of the strap carried by the adjacent section.

In testimony whereof I affix my signature.

GEORGE X BLONDO.
his
mark